(12) United States Patent
Fox et al.

(10) Patent No.: US 11,042,575 B2
(45) Date of Patent: Jun. 22, 2021

(54) PRESENTING CONTENT UPDATES BASED ON CONTEXTUAL INFORMATION IN A COLLABORATIVE ENVIRONMENT

(71) Applicant: Microsoft Technology Licensing, LLC, Redmond, WA (US)

(72) Inventors: Seth D. Fox, Seattle, WA (US); Daniel P. Costenaro, Kirkland, WA (US); Erez Kikin Gil, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 16/360,214

(22) Filed: Mar. 21, 2019

(65) Prior Publication Data

US 2020/0301951 A1 Sep. 24, 2020

(51) Int. Cl.
*G06F 16/332* (2019.01)
*G06F 16/176* (2019.01)
*G06F 40/169* (2020.01)

(52) U.S. Cl.
CPC ........ *G06F 16/3326* (2019.01); *G06F 16/176* (2019.01); *G06F 40/169* (2020.01)

(58) Field of Classification Search
CPC ... G06F 16/3326; G06F 16/176; G06F 40/169
USPC ........................................................ 707/749
See application file for complete search history.

(56) References Cited

U.S. PATENT DOCUMENTS

| | | | | |
|---|---|---|---|---|
| 2009/0204882 | A1* | 8/2009 | Hollander | G06F 16/954 715/230 |
| 2010/0070845 | A1* | 3/2010 | Facemire | G06Q 10/10 715/230 |
| 2011/0184828 | A1* | 7/2011 | Siegel | G06F 16/9562 705/26.1 |
| 2018/0285326 | A1 | 10/2018 | Goyal et al. | |

FOREIGN PATENT DOCUMENTS

WO 2011019295 A1 2/2011

OTHER PUBLICATIONS

"International Search Report and Written Opinion Issued in PCT Application No. PCT/US2020/022508", dated May 27, 2020, 10 Pages.

* cited by examiner

*Primary Examiner* — Robert Stevens
(74) *Attorney, Agent, or Firm* — Michael Best & Friedrich LLP

(57) ABSTRACT

Systems and methods for presenting content updates in a collaborative computing environment. One system includes a memory storing content and annotations generated in the collaborative computing environment an electronic processor communicatively coupled to the memory. The electronic processor is configured to retrieve, from the memory, a plurality of annotations associated with a document. The electronic processor is configured to assign a relevancy score to each of the plurality of annotations based on at least one relevancy factor associated with the annotation. The electronic processor is configured to determine a subset of (Continued)

the plurality of annotations from the plurality of annotations based on the relevancy score for each annotation. The electronic processor is configured to display the subset of the plurality of annotations.

18 Claims, 8 Drawing Sheets

FIG. 6

PRESENTING CONTENT UPDATES BASED ON CONTEXTUAL INFORMATION IN A COLLABORATIVE ENVIRONMENT

FIELD

Embodiments described herein relate to the presentation of content changes to users in a collaborative environment and, in particular, to the use of contextual information to intelligently present content to a user based on relevance.

SUMMARY

Collaborative computing systems allow multiple users on multiple computing devices to simultaneously access shared content. For example, a collaboration server may present a word processing document at various times to multiple remote users in a collaboration session. Each of the users in the collaboration session can view the document and update its content. Updates to the document (referred to herein as "annotations") are cumulative. Each collaborators who accesses the document is presented with the annotations made by the other collaborators.

When a user accesses a document, the user is presented with a list of annotations (e.g., all the annotations that were added since the last time the user accessed the document, since the document was initially created, or the like). Annotations are presented and navigated in a linear fashion (e.g., chronologically, tied to their respective place within the document, and the like). All updates, regardless of their size or importance, are presented in the same fashion. For documents that have large quantities of collaborators or annotations, linear presentation is ineffective and inefficient. It creates confusion and information overload, and fails to differentiate between meaningful updates and more mundane updates.

Accordingly, to reduce user confusion and increase the efficiency of the collaborative environment, embodiments described herein use contextual information to present annotations to users based on relevance. Some embodiments provide a document change tracking user interface in a content creation application that improves the user experience for collaboration, particularly for documents that are rich with annotations and collaborators that lack explicit user assignments. For example, systems and methods presented herein analyze annotations and characteristics of users to automatically determine how relevant each annotation is to a particular user and automatically present each annotation to the user at a level appropriate to its relevance to that user. One aspect of the document change tracking user interface provides for variable granularity in the display of the annotations: the more important the information, the more informative the displayed annotations are. For example, when there is information that is critical for the user to know, such information can be shown at a level appropriate to its criticality. Accordingly, in some situations, only a subset of the most relevant annotations are initially presented to the user, which allows the user to quickly ascertain what annotations deserve their immediate attention, resulting in a better user experience. In some embodiments, the displayed annotations can be collapsed and grouped based on typology, for example, to ignore low-level details, such as a single word correction and simple object moves. For example, rather than navigating a list of minor spelling and grammar corrections to eventually deal with a substantive change in content, the substantive change may be presented first. In another example, a user may be presented with only those annotations entered by that user's supervisor or other key collaborators. Another aspect of the document change tracking user interface provides a relevance-based ordering of the annotations. For example, the annotations may be ordered using a combination of time and importance. Also, in some embodiments, notifications regarding annotations may be made according to a preferred method of communication and not just as part of the document change tracking application.

Embodiments described herein therefore result in more efficient use of collaboration system resources, and the improved operation of the collaboration systems for all users.

In particular, one embodiment provides a computing system presenting content updates in a collaborative computing environment. The computing system includes a memory storing content and annotations generated in the collaborative computing environment an electronic processor communicatively coupled to the memory. The electronic processor is configured to retrieve, from the memory, a plurality of annotations associated with a document. The electronic processor is configured to assign a relevancy score to each of the plurality of annotations based on at least one relevancy factor associated with the annotation. The electronic processor is configured to determine a subset of the plurality of annotations from the plurality of annotations based on the relevancy score for each annotation. The electronic processor is configured to display the subset of the plurality of annotations.

Another embodiment provides a method for presenting content updates in a collaborative computing environment. The method includes receiving, from a user, a request to view a document. The method includes retrieving, from a memory storing content and annotations generated in the collaborative computing environment, the document and a plurality of annotations associated with the document. The method includes assigning a relevancy score to each of the plurality of annotations based on at least one relevancy factor associated with the annotation. The method includes determining a subset of the plurality of annotations from the plurality of annotations based on the relevancy score for each annotation. The method further includes displaying the subset of the plurality of annotations within a collaborative application associated with the document.

Yet another embodiment provides a non-transitory computer-readable medium including instructions executable by an electronic processor to perform a set of functions. The set of functions includes receiving, from a user, a request to view a document. The set of functions includes retrieving, from a memory storing content and annotations generated in the collaborative computing environment, the document and a plurality of annotations associated with the document. The set of functions includes assigning a relevancy score to each of the plurality of annotations based on at least one relevancy factor associated with the annotation. The set of functions includes determining a subset of the plurality of annotations from the plurality of annotations based on the relevancy score for each annotation. The set of functions further includes displaying the subset of the plurality of annotations within a collaborative application associated with the document.

BRIEF DESCRIPTION OF THE DRAWINGS

FIGS. 3-6 illustrate example graphical user interfaces generated by the collaborative computing environment of FIG. 1 according to some embodiments of the invention.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
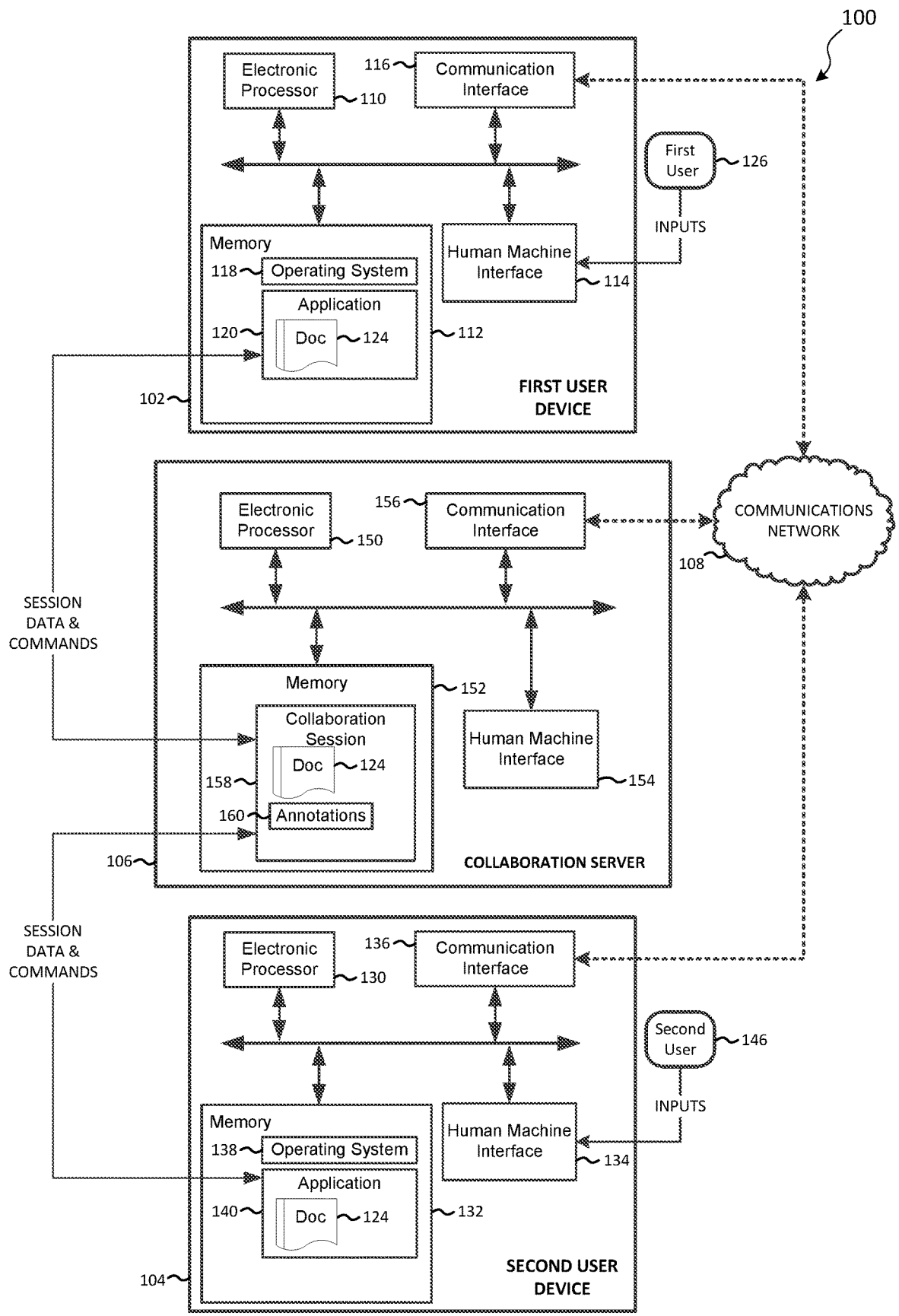
FIG. 1 schematically illustrates a collaborative computing environment according to some embodiments.

FIG. 1 illustrates an example system 100 for executing a collaborative computing environment. As illustrated in FIG. 1, the system 100 includes a first user device 102, a second user device 104, and a collaboration server 106. It should be understood that the system 100 is provided as one example and, in some embodiments, the system 100 may include additional components. In particular, the system 100 may include more than two user devices and the functionality described herein as being performed by the collaboration server 106 may be combined and distributed in various configurations. For example, in some embodiments, the functionality of the collaboration server 106 may be performed by one or more servers or other hardware components of a cloud-computing platform, for example, the Microsoft® Azure® platform.

The first user device 102, the second user device 104, and the collaboration server 106 are communicatively coupled by at least one communications network 108. The communications network 108 may be implemented using a wide area network (e.g., the Internet), a local area network (e.g., an Ethernet or Wi-Fi™ network), a cellular data network (e.g., a Long Term Evolution (LTE™) network), and combinations or derivatives thereof. In some embodiments, rather than or in addition to communicating over the communications network 108, the first user device 102, the second user device 104, the collaboration server 106, or a combination thereof may communicate over one or more dedicated (wired or wireless) connections.

The first user device 102 is a computing device, for example, a laptop computer, desktop computer, tablet computer, computer terminal, smart telephone, smart watch, smart television, and the like. In the example illustrated in FIG. 1, the first user device 102 includes an electronic processor 110 (e.g., a microprocessor, application-specific integrated circuit (ASIC), or other suitable electronic device configured to execute instructions), a memory 112, a human machine interface 114, and a communication interface 116. The electronic processor 110, the memory 112, the human machine interface 114, and the communication interface 116 are communicatively coupled over one or more communication lines or buses, wirelessly, or combinations thereof. It should be understood that, in other constructions, the first user device 102 includes additional, fewer, or different components than those illustrated in FIG. 1.

The communication interface 116 may include a wireless transmitter or transceiver for wirelessly communicating over the communications network 108. Alternatively or in addition to a wireless transmitter or transceiver, the communication interface 116 may include a port for receiving a cable, for example, an Ethernet cable, for communicating over the communications network 108 or a dedicated wired connection. It should be understood that, in some embodiments, the first user device 102 communicates with the collaboration server 106 through one or more intermediary devices, for example, routers, gateways, relays, and the like.

The memory 112 includes a non-transitory, computer-readable storage medium storing program instructions and data. The electronic processor 110 is configured to retrieve from the memory 112 and execute, among other things, software (executable instructions) to perform a set of functions, including the methods described herein. As illustrated in FIG. 1, in some embodiments, the memory 112 stores an operating system (OS) 118 and a software application 120.

The memory 112 also stores a document 124 (e.g., as created or modified by the software application 120). It should be understood that the memory 112 may store additional applications, data, or combinations thereof. Also, in some embodiments, the operating system 118, the software application 120, and the document 124 may be stored in separate memories. Furthermore, in some embodiments, the software application 120 and the document 124 or a portion thereof may be stored remotely from the first user device 102, such as on the collaboration server 106, within a cloud service environment, or the like. For example, in some embodiments, the software application 120 includes a browser application or a client application for accessing a document stored in a cloud environment via a web- or cloud-based productivity application (allowing the user to interact with the document without the need for a locally-installed version of the productivity application or the document 124).

The operating system 118 may be, for example, one of the Windows® family of operating systems provided by Microsoft® Corporation. The operating system 118, when executed by the electronic processor 110, may control use of the components included in the first user device 102, including the electronic processor 110, the memory 112, the human machine interface 114, the communication interface 116, or combinations thereof.

The software application 120, when executed by the electronic processor 110, allows a user (e.g., the first user 126) to, for example, access, create, edit, store, transmit, and receive data, for example, the document 124. In some embodiments, the document 124 is a productivity application document (e.g., a word processing document, a spreadsheet, a presentation, an email, and the like). In some embodiments, the document 124 may be a media file (e.g., a video file, an image file, an audio file, and the like). In some embodiments, the document 124 may be a web page (e.g., an HTML file or another suitable format). Whatever the type of document, the software application 120 operates to allow multiple users to collaboratively interact with the document. For example, the software application 120 may include a word processing application, a spreadsheet application, a communication application (e.g., an email client application, a video chat application, and the like), a drawing application, a browser application, a web content editor, a video editor, an audio editor, an application that combines functions of the foregoing, or the like. In some embodiments, the software application 120 is one of the Microsoft Office® suite of applications (e.g., Outlook®, Word®, Excel®, PowerPoint®, Internet Explorer®, and the like). In some embodiments, the document 124 is a locally stored copy of a document stored, for example, on the collaboration server 106.

As set forth in detail below, the software application 120 participates in a collaborative computing session with the second user device 104 and the collaboration server 106, for example, to provide for group editing or creation of the document 124.

The human machine interface (HMI) 114 receives input from, and provides output to, users (e.g., the first user 126) of the first user device 102. The HMI 114 may include a keyboard, a keypad, a microphone, a camera, a cursor-control device (e.g., a mouse, a joystick, a trackball, a touch pad, and the like), a display (e.g., a liquid crystal display (LCD), a light emitting diode (LED) display, a touchscreen), a speaker, and the like. The HMI 114 communicates with the operating system 118 to send and receive data to and from the operating system 118 and the software application 120. In particular, input from a user of the software application 120 are communicated from the HMI 114 to the operating system 118, which conveys the input (or a portion or version thereof) to the software application 120. It should be understood that some components of the HMI 114, for example, a touchscreen, function both as an input device and an output device.

The second user device 104 is a computing device similar to the first user device 102. The second user device 104 may be, for example, a laptop computer, desktop computer, tablet computer, computer terminal, smart telephone, smart watch, smart television, and the like. In the example illustrated in FIG. 1, the second user device 104 includes an electronic processor 130 (e.g., a microprocessor, application-specific integrated circuit (ASIC), or other suitable electronic device configured to execute instructions), a memory 132, a human machine interface 134, and a communication interface 136. The electronic processor 130, the memory 132, the human machine interface 134 (for receiving input from and providing output to a second user 146), and the communication interface 136 are communicatively coupled over one or more communication lines or buses, wirelessly, or combinations thereof. It should be understood that, in other constructions, the second user device 104 includes additional, fewer, or different components than those illustrated in FIG. 1. The second user device 104 is configured and operates similarly to the first user device 102. Similarly named components in the second user device 104 perform similar functions as those described above with respect to the first user device 102. In some embodiments, the second user device 104 is nearly identical to the first user device 102 (e.g., both are the same model of laptop computer).

In the example provided in FIG. 1, the collaboration server 106 is also a computing device that includes an electronic processor 150, a memory 152, an (optional) HMI 154, and a communication interface 156, which may be similar to the electronic processor 110, memory 112, HMI 114, and communication interface 116 described above for the first user device 102. The components of the collaboration server 106 are communicatively coupled over one or more communication lines or buses, wirelessly, or combinations thereof. It should be understood that, in other constructions, the collaboration server 106 includes additional, fewer, or different components than those illustrated in FIG. 1.

As described in detail herein, the collaboration server 106 provides a multi-session collaborative environment to allow groups of users (e.g., the first user 126 and the second user 146) to engage with one another and with shared content (e.g., the document 124). As illustrated in FIG. 1, the memory 152 includes, among other applications and data, a collaboration session 158 and annotations 160. The collaboration session 158 presents shared content, for example, the document 124, to multiple remote users (e.g., the first user 126 and the second user 146) accessing the collaborative environment via one or more user devices (e.g., the first user device 102 and the second user device 104). All of the users in the collaboration session 158 can view the document 124, and users may be selectively allowed to control or edit the content of the document 124. As described in more detail below, the collaboration server 106 transmits and receives collaboration session data and commands to and from the user devices, for example, via the communications network 108. Session data and commands include, for example, annotations made to the document 124 by users. As used herein, the terms "annotation" and "annotations" refer to updates made to the document 124 by one or more users. Examples of annotations include the addition of content to the document 124, the deletion of content from the document 124, the movement of a portion of content within the document 124, the alteration of a portion of content within the document 124 (e.g., replacing one word with another), a change to the formatting of some or all of content of the document 124, or the addition of a comment or flag within the content of the document 124. In some embodiments, the annotations 160 are stored apart from, and linked to their respective documents. In some embodiments, each document stores its own annotations as part of the document (e.g., in metadata).

Although possible, not all users access the collaboration session 158 to view or edit the document 124 simultaneously. Over the life of a document in the collaborative computing environment (e.g., the document 124), various users may view or update the document at various times. For example, the first user device 102 and the second user device 104 participate in the collaboration session 158 to view and update the document 124. The first user device 102 and the second user device 104 receive inputs from the first user 126 and the second user 146. The inputs may be requests to make updates (annotations) to the document 124. The inputs may also be requests to view the document 124. The inputs are sent to the collaboration server 106, for example, via the communications network 108.

The collaboration server 106 receives changes for the document 124 from the first user device 102 and the second user device 104 and coordinates the changes to the document 124. The first user device 102 and the second user device 104 may not participate in the collaboration session 158 simultaneously. For example, the first user device 102 sends a sentence to be added to the document 124. The collaboration server 106 receives the annotation to the document 124, identifying it with the first user 126, updates the document 124 accordingly, and stores a record of the annotation in the memory 152. At a later time, the second user device 104 sends a request to view the document 124 to the collaboration server 106, which transmits the latest version of the document 124, including any annotations added since the second user 146 last accessed the document 124, to the second user device 104. For example, the added sentence is presented as an annotation to the second user device 104, which did not originate that change.

Figure 2:
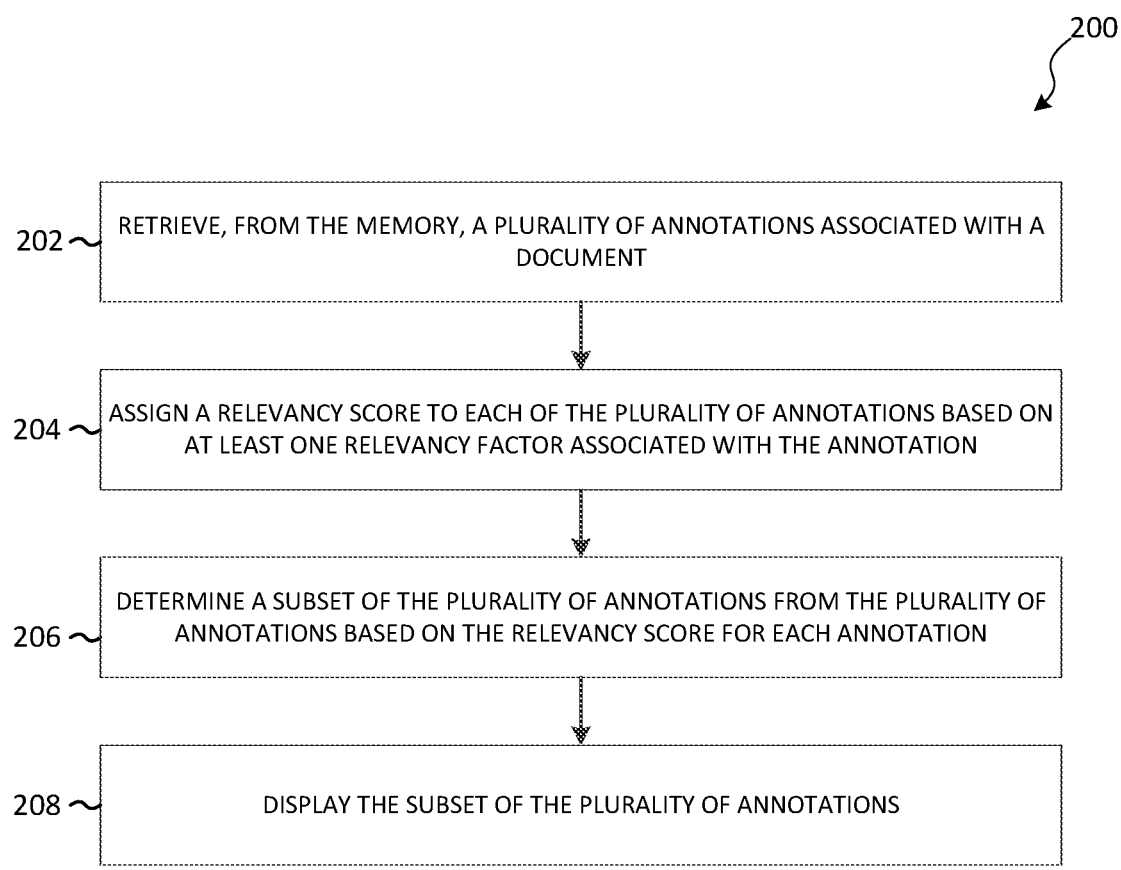
FIG. 2 is a flowchart illustrating a method of presenting content updates in a collaborative computing environment performed by the system of FIG. 1 according to some embodiments.

Each time a user views the document, the user is able to view some or all of the annotations added since the user last viewed the document. In some embodiments, a user is presented with the annotations. In some embodiments, a user must approve some or all of the presented annotations. As noted above, there may be many annotations since the user last accessed the document, and some annotations are more significant than others. Accordingly, to provide more effective and efficient presentation of the annotations to the user, it is desirable to present the annotations to the user based on contextual information. FIG. 2 illustrates an example method 200 for presenting content updates in a collaborative computing environment. The method 200 is described as being performed by the collaboration server 106 and, in particular, the electronic processor 150. However, it should be understood that in some embodiments, portions of the method 200 may be performed by other devices, including for example, the first user device 102 and the second user device 104. While FIG. 1 illustrates two user devices (the first user device 102 and the second user device 104), it should be understood that embodiments of the method 200 may be used with more or fewer user devices than illustrated. Embodiments may also include more than one collaboration server 106.

The electronic processor 150 retrieves, from the memory 152, a plurality of annotations associated with the document 124 (at block 202). For example, the electronic processor 150 receives, from the first user 126, a request to view the document 124. In some embodiments, the request to view the document 124 is a request to open the document 124 using the appropriate application (e.g., the application 120). In such embodiments, the electronic processor 150 retrieves the plurality of annotations and the document 124 from the memory 152 in response to receiving the request. In some embodiments, the plurality of annotations includes all annotations made since the last time the first user 126 accessed the document. In some embodiments, the plurality of annotations includes all annotations that the user has not approved or acknowledged, regardless of when they were added to the document 124.

The electronic processor 150 assigns a relevancy score to each of the plurality of annotations (at block 204). A relevancy score is a numerical value (e.g., a decimal number, an integer, or a percentile) that indicates how relevant an annotation is to the user viewing the document (e.g., as compared to the other annotations). For example, an annotation having a relevancy score greater than the relevancy score for another annotation is considered more relevant to a particular user than the other annotation. In some embodiments, the relevancy score is based on at least one relevancy factor associated with the annotation. Relevancy factors include contextual information for the annotation that tend to increase the relevancy or importance of an annotation, either in general or to a particular user or users. In some embodiments, multiple relevancy factors combine to produce a relevancy score, with some factors increasing the relevancy score and other factors decreasing the relevancy score. In some embodiments, each annotation begins with an initial relevancy score that is represents a neutral relevancy level (e.g., 0.5 on a scale of 0 to 1.0). In such embodiments, applicable relevancy factors (as described below) are applied to the initial relevancy score to determine a final relevancy score for the annotation. For example, relevancy factors may be assigned numerical values, which are added or subtracted from the initial relevancy score. In another example, relevancy factors may be assigned multipliers, which are applied to the initial relevancy score. In some embodiments, each annotation begins with a relevancy score of 0, and each relevancy factor is assigned a positive or negative numeric value. In such embodiments, applicable relevancy factors are added to produce a final relevancy score.

One example of a relevancy factor is a characteristic of the annotation itself (e.g., the nature of the annotation). For example, an annotation adding an entire paragraph to a document increases the relevancy score more than the deletion of a space. In another example, a number added to or changed in a sales chart increases the relevancy score more than the correction of a spelling error. In another example, a change to the outline or structure of a document increases the relevancy score more than a change in formatting (e.g., selecting a new font). In another example, the content of the annotation may contribute to the relevancy score. For example, a comment that includes a question for the user viewing the document (or that includes an answer to a question posed by the user) increases the relevancy score more than a comment directed to another user. In another example, the location of an annotation relative to other annotations within a document may contribute to the relevancy score. For example, when a particular section of the document contains a large quantity of annotations, this may indicate that focus is being directed at this section, increasing the relevancy for all annotations in that section. In some embodiments, the time of an annotation may contribute to the relevancy score. For example, a more recent annotation may increase a relevancy score more than a less recent annotation, particularly when the document is time-sensitive (e.g., a meeting to review the document is occurring soon). In another example, a measure of how actionable and complete an annotation is may contribute to the relevancy score (e.g., whether the annotation presents alternative language instead of just suggesting that alternative language be developed, whether the annotation is a directive to make a change or a question as to whether a change should be made). In another example, annotation content that contains links to external resources (e.g., documents, web pages, media files, people, aliases, etc.) may increase a relevancy score more than content that is not linked to external resources.

Another example of a relevancy factor is a characteristic of an annotator of the document (e.g., the user who entered the annotation). Characteristics may include the role of the annotator within a collaboration team, within the larger organization, with respect to an individual document, and the like. For example, annotations made by the manager of the collaboration team for the document may have a higher relevancy score than annotations made by members of the team. In another example, annotations made by legal counsel may increase the relevancy score in general. In another example, annotations from users who are more prolific editors may affect the relevancy value. In another example, an annotation's relevancy score is affected by whether the annotator is a subject matter expert in the subject matter covered by the annotation. In some embodiments, a relevancy score determined in part by the annotator's expertise may be affected by how often that annotator's feedback is accepted or rejected. For example, a marketing expert's annotations to a marketing document may generate a higher relevancy score than a non-expert. However, when such an expert's annotations are rejected more often than they are accepted, the relevance score is set lower than for a similar expert whose annotations are more often accepted. In some embodiments, software tools (e.g., provided on the collaboration server 106, within the application 120, or remotely) analyze (e.g., using natural language processing) the annotations made by an annotator to understand and classify the annotator's role for a given document (e.g., a reviewer, a primary author, a contributor to a specific section, a spectator, and the like).

Another example of a relevancy factor is a characteristic of a viewer of the document (e.g., the user requesting the document). For example, where the viewer has a particular area of responsibility (e.g., marketing), annotations to portions of the document relating to that area of responsibility have a higher relevancy score than annotations to other portions. The viewer's position in an organization, workload, schedule, and other similar characteristics may also be used to determine the relevancy score. For example, when the viewer's schedule indicates a meeting (e.g., a sales meeting) in the near future regarding a particular topic associated with the annotation (e.g., a change to a revenue chart) this increases the relevancy score for that annotation. In another example, the viewer's schedule may indicate that the viewer has a particular amount of time to review the document, and the annotations' relevancy scores may be determined in part based on how much time it would take to review them as compared to the time available to the user. In another example, the type of computing device used by the user may affect the relevancy score. For example, certain types of annotations (e.g., questions posed to the user) may be more suitable for viewing on the screen of a smart telephone than other types of annotations (e.g., complex redlines of large portions of text.

Another example of a relevancy factor is a relationship between the viewer and the annotator. For example, annotations from members of the user's team may be more relevant to the user than annotations from outside the team. In another example, annotations from a supervisor of the user may be more relevant to the user than annotations from the peers of the user. In another example, when the viewer, based on historical data, frequently interacts with the annotator's annotations, that annotator's annotations may be considered more relevant to the user. In another example, when the viewer, based on historical data, nearly always accepts or nearly always rejects annotations made by the annotator, that annotator's annotations may be considered more relevant to the user.

Another example of a relevancy factor is a relationship between the viewer's communications and the annotation. For example, when a viewer has an incoming email, instant message, or other form of communication that refers to information related to an annotation, that annotation may be more relevant to the viewer than annotations not mentioned in the viewer's communications.

In some embodiments, the relevancy factors are determined using software tools to analyze the users and content (e.g., the documents and annotations) of the collaborative computing environment. Such tools use machine learning and data analytics to, for example, identify relevancy factors as described herein. Some embodiments use the Delve® and MyAnalytics® tools provided by Microsoft® Corporation.

In some embodiments, the electronic processor 150 assigns a weight to each of the plurality of annotations. A weight is a decimal multiplier, which is applied to either increase or decrease the relevancy score. In such embodiments, the electronic processor 150 determines, for each of the plurality of annotations, a weighted relevancy score based on the relevancy score and the weight. In some embodiments, annotations are weighted based on the relationship between the viewer and the annotator. For example, annotations from the user's supervisors may be weighted more heavily than other annotations so that a user sees these annotations ahead of annotations from other users that might otherwise be deemed more relevant based on other relevancy factors. In some embodiments, weights are applied to individual relevancy factors prior to their inclusion in or application to the relevancy score.

The electronic processor 150 determines a subset of the plurality of annotations from the plurality of annotations based on the relevancy score for each annotation (at block 206). In some embodiments, the electronic processor 150 determines the subset of the plurality of annotations by selecting annotations with a relevancy score that exceeds a threshold (e.g., by selecting annotations with relevancy scores between 80% and 100%). In some embodiments, the plurality of annotations are ordered by relevancy score and predetermined quantity of the higher relevancy scores are chosen (e.g., the top ten annotations by relevancy score). In embodiments where the relevancy scores are weighted, the electronic processor 150 determines the subset of the plurality of annotations by selecting a subset of the plurality of annotations based on the weighted relevancy score for each of the plurality of annotations.

After the annotations have been evaluated based on contextual information, the electronic processor 150 displays the subset of the plurality of annotations for the user (at block 208). For example, the electronic processor 150 may display only those annotations in the subset of annotations. In some embodiments, the annotations not in the subset may be hidden, or presented in collapsed format. In some embodiments, all annotations are displayed, and the subset of annotations is highlighted (e.g., by being placed at the top of a list, presented in a different font or color, and the like). In some embodiments, the electronic processor 150 displays the subset of the plurality of annotations within a collaborative application associated with the document. For example, where the document 124 is a word processing document, the subset is displayed when the document 124 is opened in the word processing application (see FIGS. 3-6). In some embodiments, the electronic processor 150 displays the subset of the plurality of annotations in descending order based on the relevancy scores. In some embodiments, the electronic processor 150 sorts the subset of the plurality of annotations into one or more groups based on a type for each annotation, and displays the subset of the plurality of annotations in a collapsed format based on the one or more groups. This further reduces the quantity of annotations the user has to take in when first accessing the document, and allows the user to selectively "drill down" into annotations based on type.

In some embodiments, the annotations are displayed based on the nature of the annotation. The more relevant the annotation, the more information is exposed. In other words, critical annotations would be displayed with more content, and less relevant annotations would be displayed with less content. For example, when an image determined to be relevant is added to a document, the annotation may include that image, enabling a reviewer to more quickly understand the annotation, without having to review that portion of the document directly.

In some embodiments, the electronic processor 150 periodically retrieves a plurality of annotations associated with a document for analysis (e.g., to determine whether critical updates have been made since the annotations for the document were last analyzed). For each of the subset of annotations, the electronic processor 150 determines a criticality score for each of a plurality of collaborators associated with the document. The criticality score is similar to the relevancy score described above, and is used to determine whether a user should be proactively alerted to an annotation. For example, the electronic processor 150 may evaluate each annotation for relevancy to each collaborator to determine a criticality score for each annotation. The electronic processor 150 compares the criticality score to a notification threshold. When the criticality score for the collaborator exceeds a notification threshold, the electronic processor 150 sends a notification to a collaborator, the notification including the annotation. In some embodiments, the notification also includes information as to why the annotation is considered critical.

The method 200 is described above in terms of two users collaborating on a single document. However, it should be understood that the method 200 is applicable to other collaborative computing scenarios, including those with more than two users and more than one collaborative session.

Figure 3:
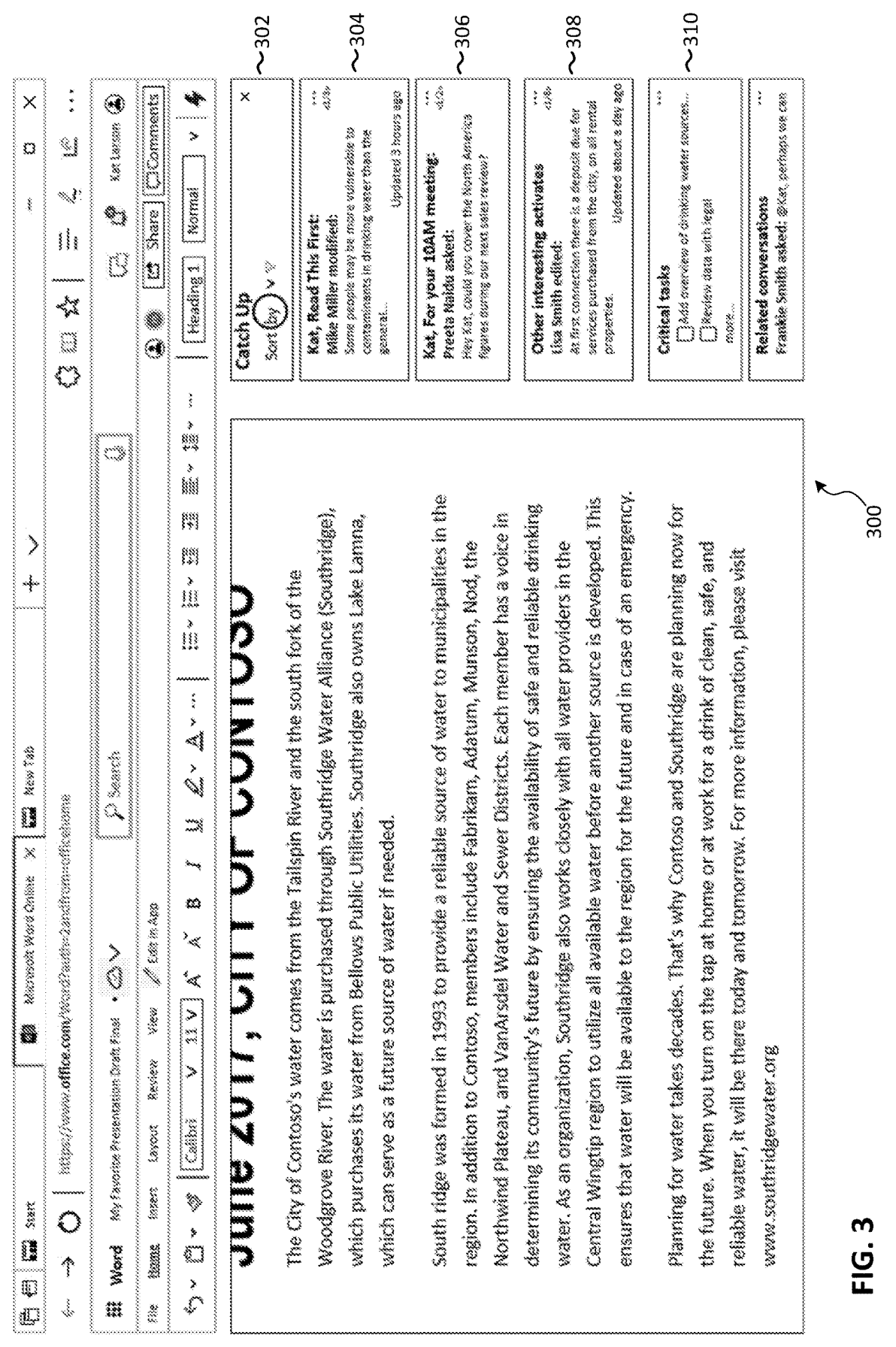

As noted, the collaboration server may display one or more subsets of annotations, based on relevancy, within an application. For example, FIG. 3 illustrates an example user interface for a web-based word processing application 300, including a menu 302 and a subset of annotations presented in boxes 304, 306, 308, and 310. The menu 302, labeled "Catch Up" as an example, allows a user to choose which subsets of relevant annotations are presented. As an example, the application 300 is displaying the annotations sorted by "Critical updates." Box 304 includes an annotation and the heading "Read This First," indicating, for example, that this annotation is the most relevant to the user. Box 306 includes an annotation that is relevant based on the user's schedule (that is, a request to discuss content during a meeting). Box 308 includes annotations of lesser relevance ("other interesting activities"). Box 310 includes a list of critical tasks assigned to the user. Box 312 includes a list of conversations that include the user and are relevant to the document.

Figure 4:
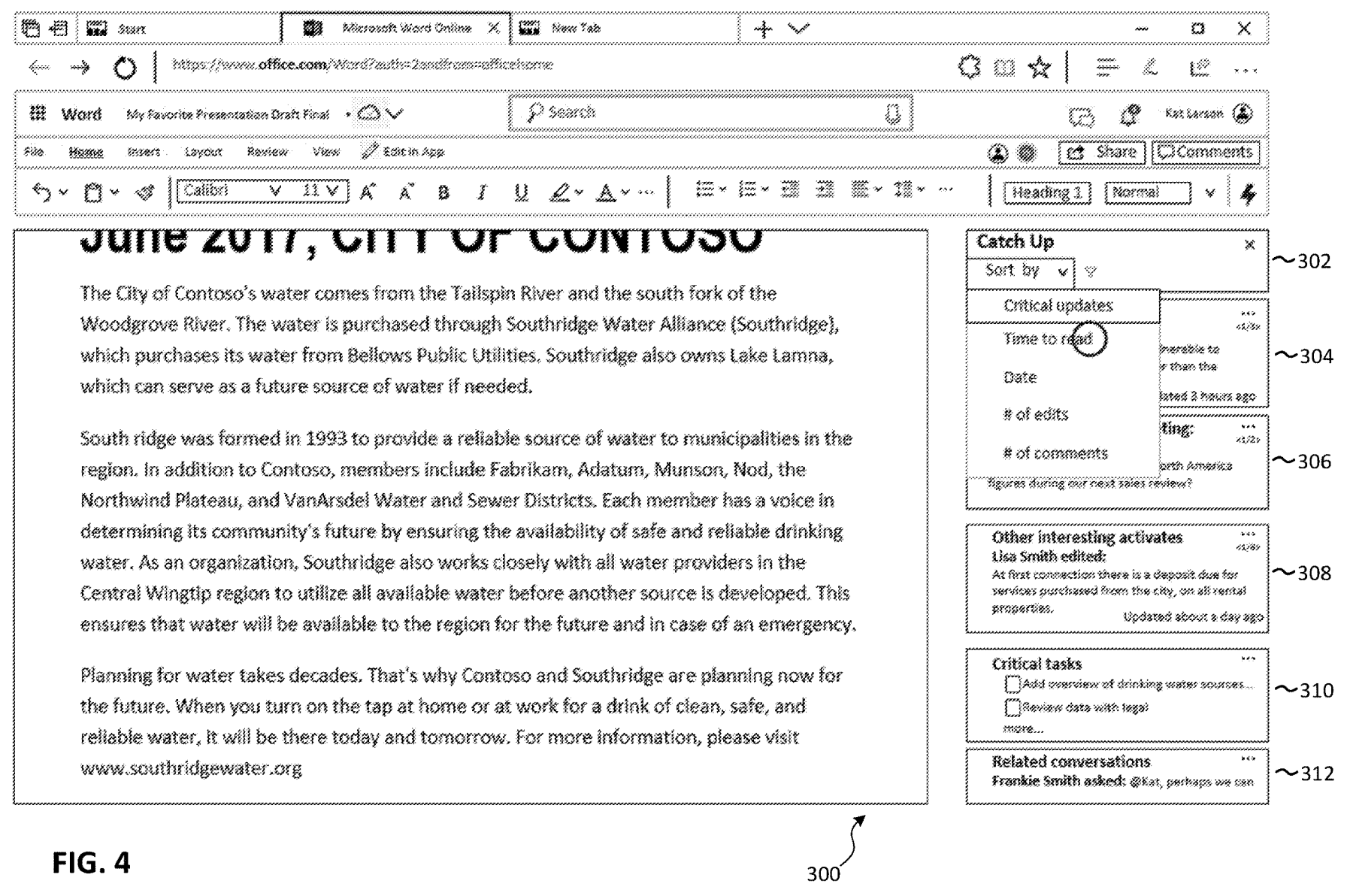
Figure 5:
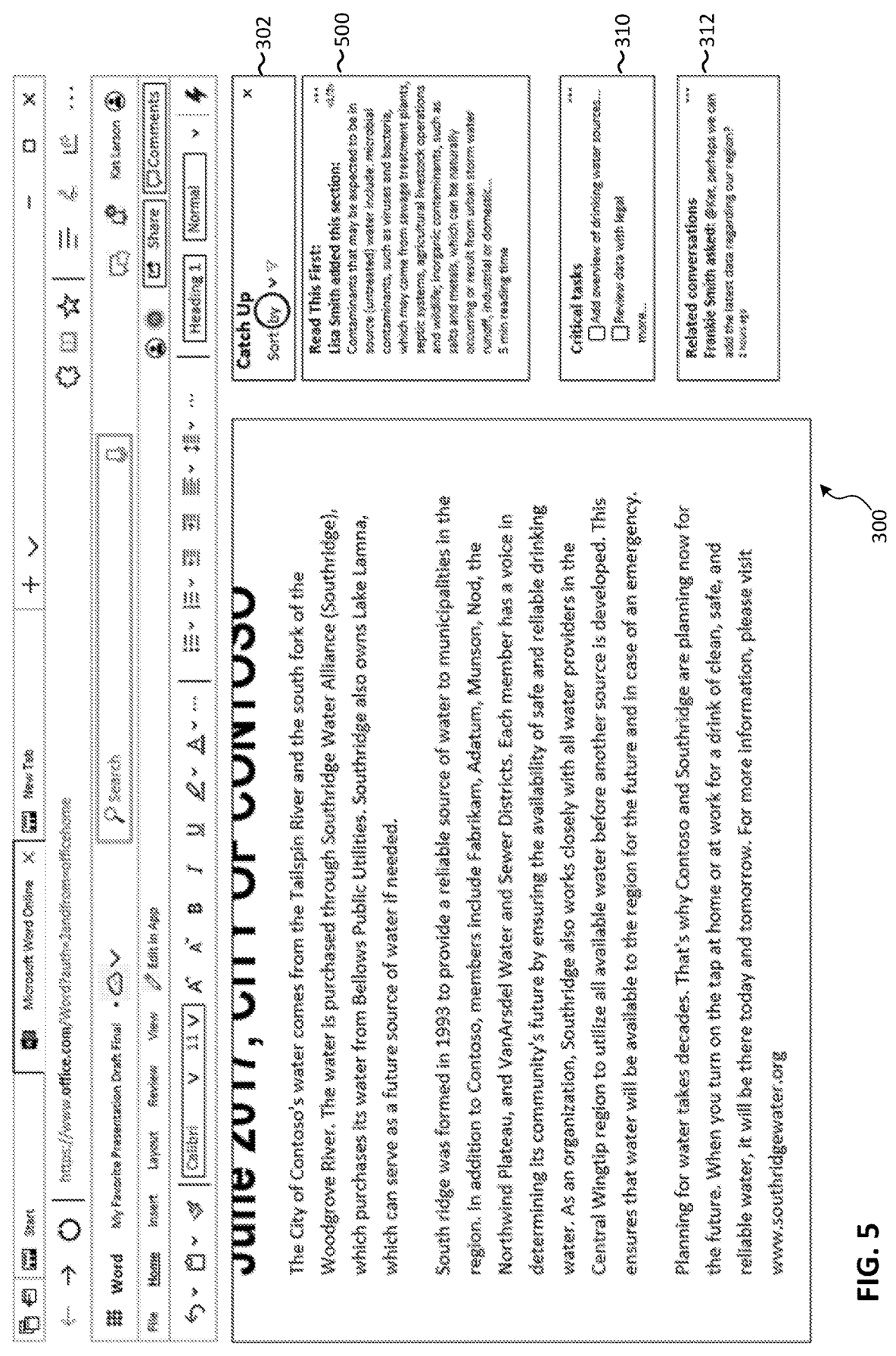

As illustrated in FIG. 4, the menu 302 allows a user to sort by "Critical updates," "Time to read," "Date," "# of edits," and "# of comments." FIG. 5 illustrates another example user interface for the web-based word processing application 300. As an example, the application 300 is displaying the annotations sorted by "Time to read." The box 500 presents a subset of annotations to the user based on the estimated time it would take the user to read the annotations. This allows a user with limited time to read the most relevant annotations, taking into account the time allowed.

Figure 6:
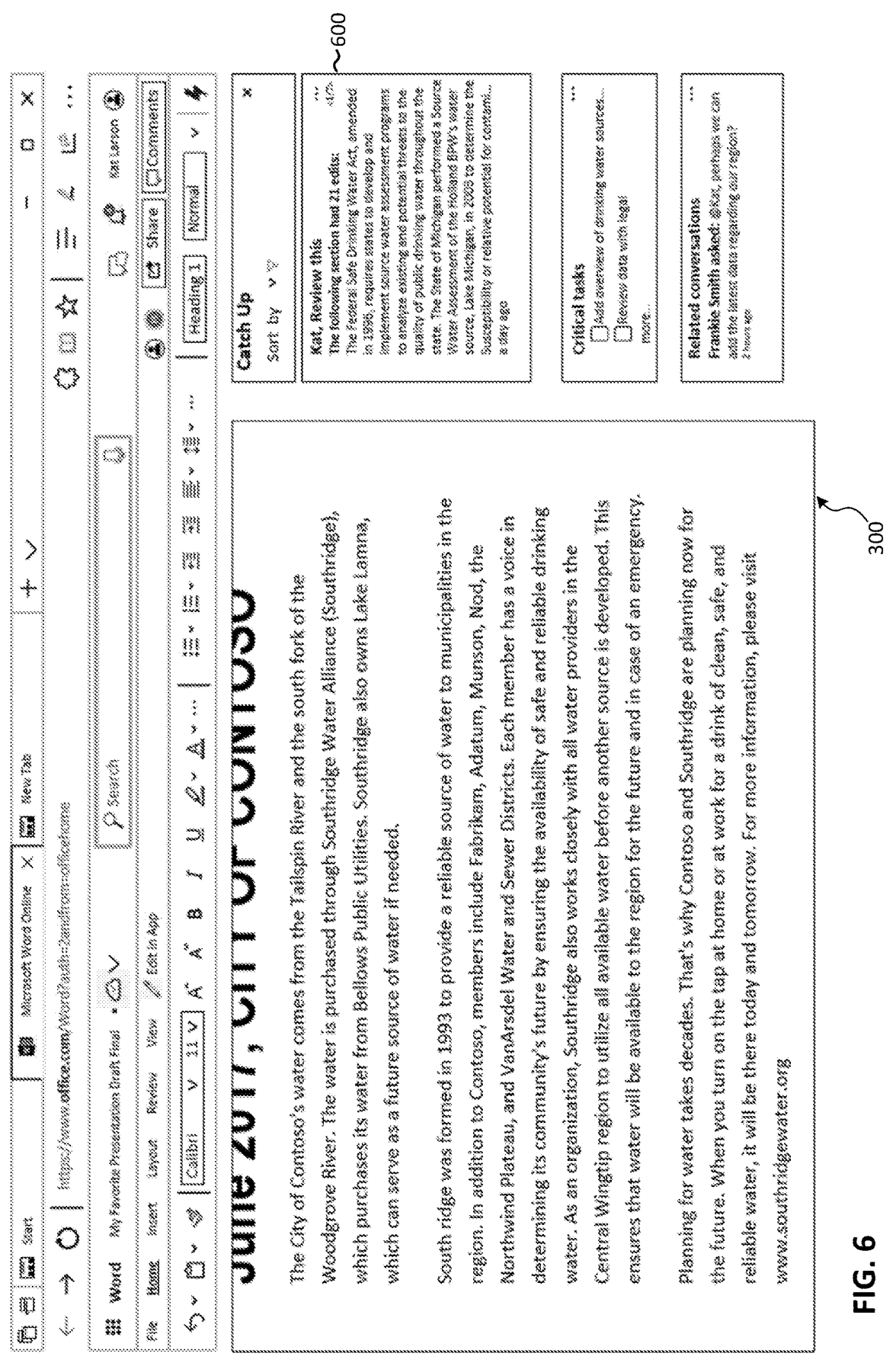

FIG. 6 illustrates another example user interface for the web-based word processing application 300. As an example, the application 300 is displaying the annotations sorted by "# of edits." The box 600 presents sections of the document to the user based on the number of annotations in the section. This allows a user to focus their efforts on reviewing the sections of the document that appear most relevant to the other collaborators.

Figure 7A:
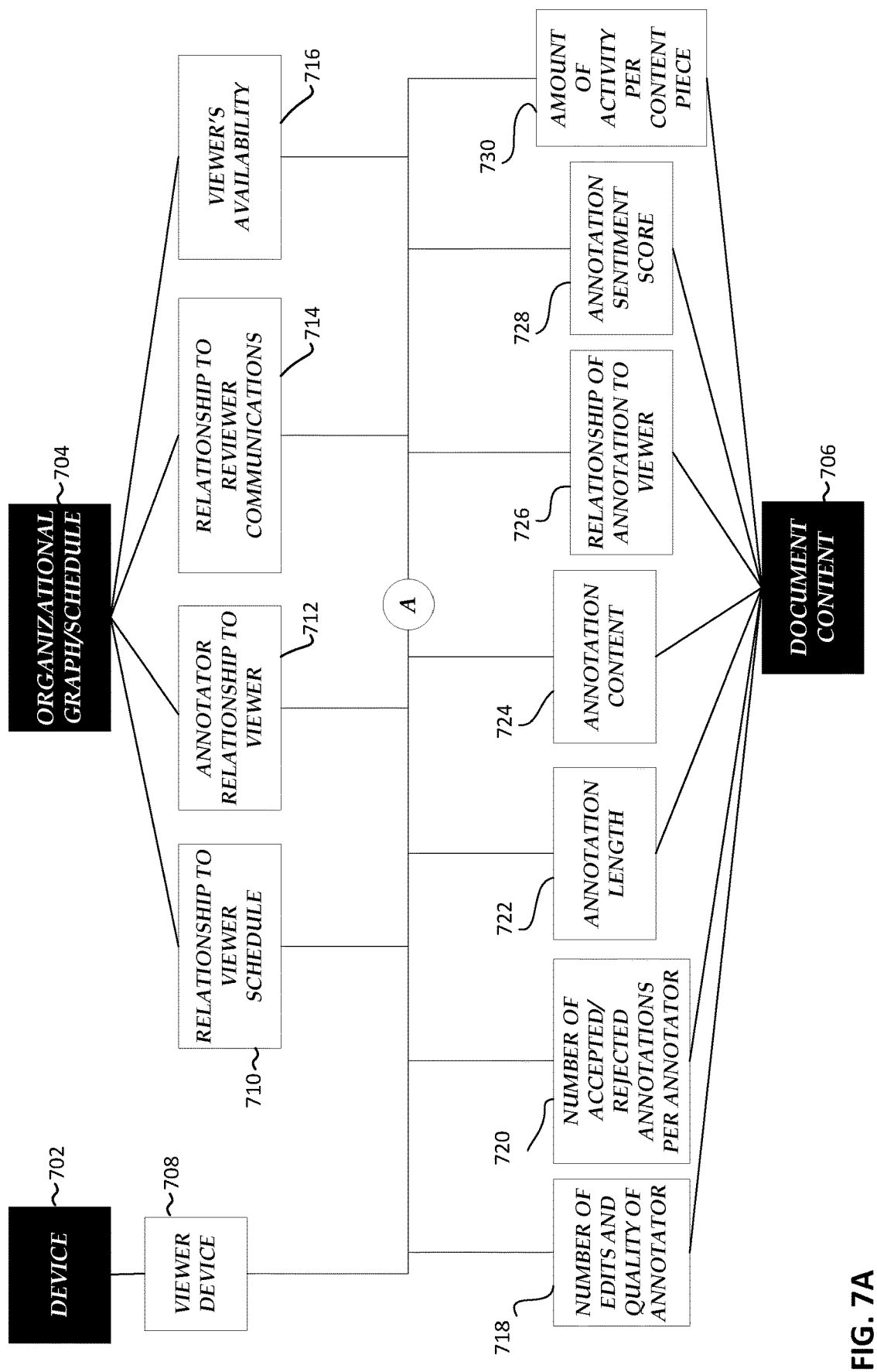
FIGS. 7A and 7B provide an alternative illustration of the method of FIG. 2, including illustrating the factors that may be considered as part of determining the relevancy of an annotation according to some embodiments of the invention.
Figure 7B:
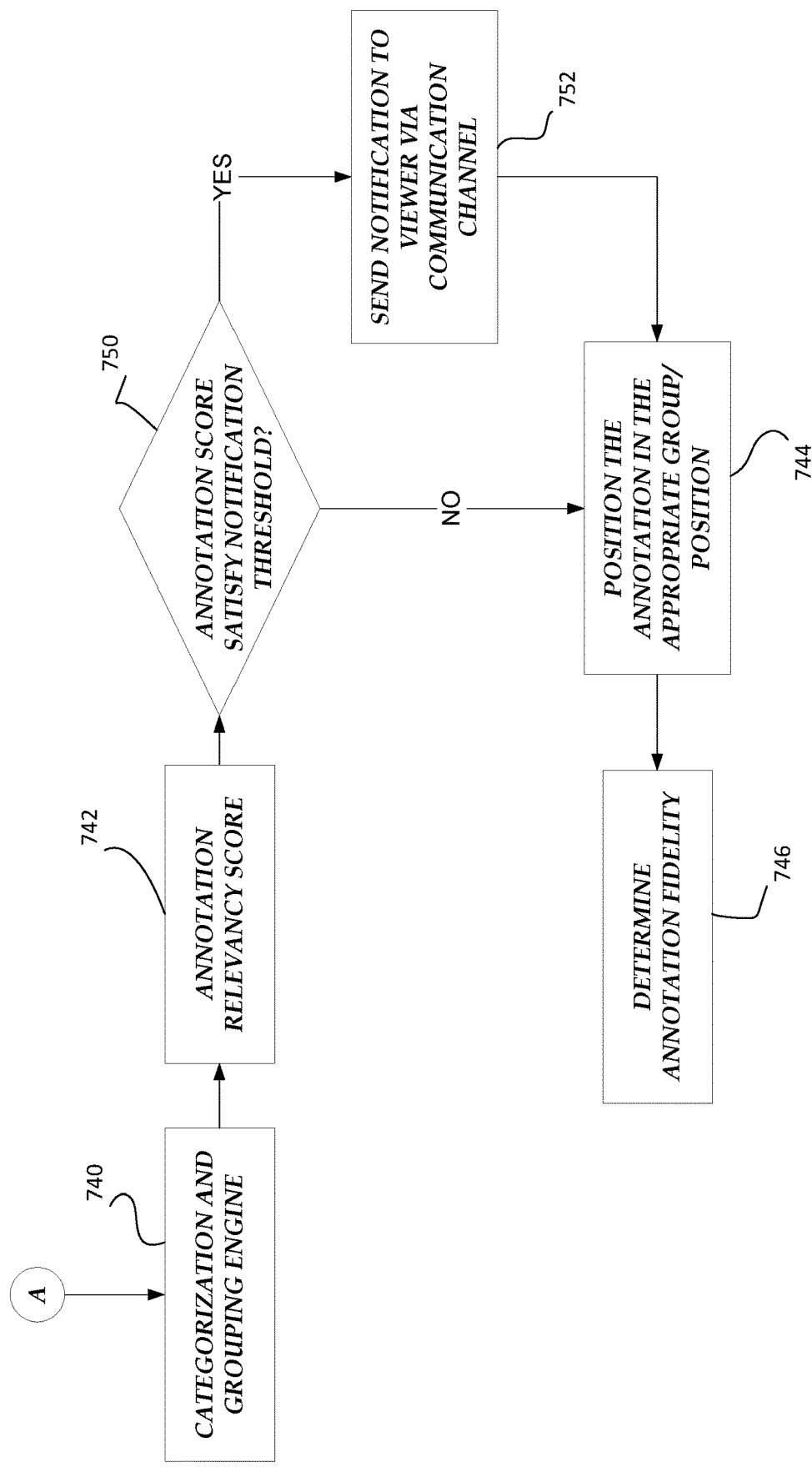

FIGS. 7A and 7B provide an alternative illustration of the method 200 described above. In particular, FIGS. 7A and 7B illustrate relevancy factors that may be taken into account when performing automatic annotation filtering and ordering as described above. As illustrated in FIG. 7A, the relevancy factors may come from one or more sources, including for example, a device 702, an organizational graph (representing relationships between viewers, annotators, and other users within an organization) and/or schedule 704 (e.g., a schedule of events of an organization, the viewer, other users, or a combination thereof), document content 706, or a combination thereof. For example, as illustrated in FIG. 7A, the type of device (at 708) (make, model, version, hardware components, software components, or the like) the viewer is using may be a relevancy factor, which may imply restrictions or abilities of the device to present annotations while maintaining fidelity of content, that is, whether the mobile device present the content as it is meant to be seen or experienced (e.g., whether the device's display is capable of rendering an image with sufficient resolution and size to allow a viewer to comprehend and evaluate any updates presented in or by the image).

With respect to the organizational graph and schedule 704 data source, a relationship of an annotation to an upcoming event or action associated with the viewer may be used as a relevancy factor (at 710). For example, reading a specific annotation may be considered urgent for a viewer due to an upcoming event or action associated with the user. Similarly, the relationship between the viewer and the annotation may be a relevancy factor (at 712). The relationship may be determined based on a hierarchical structure (e.g., an organizational structure) used to determine user roles or rankings. In other embodiments, a frequency of historical interaction between the viewer and the annotator, such as how frequently the viewer and the annotator exchange communications, attend the same meeting or event, or the like, may be used to define a relationship between the viewer and the annotator.

The relationship between the annotation and communications or other actions taken by the viewer may also be used as a relevancy factor (at 714). For example, the relevancy of an annotation may be determined based on whether an (incoming or outgoing) email, instant message (IM) message, or other form of communication refers to information that relates to an annotation. Similarly, topics, filenames, or other metadata associated with other documents or files created or manipulated by a viewer may be compared to annotations to determine relevancy.

The viewer's availability to read, review, and respond to an annotation may be also be used as a relevancy factor (at 716). For example, the viewer's schedule may be used to determine whether the viewer is available to read long or short annotations based on future commitments of the viewer or other content (e.g., whether the viewer has been waiting in a line somewhere or is sifting and focusing in an office or actively using his or her device, or the like).

As illustrated in FIG. 7A, the relevancy factors determined from the document content 706, may include the number of annotations and quality of the annotator (at 718), for example, whether the annotator has made many or few annotations, and how many of the annotator's changes have been accepted by other collaborators, based on historical data. The number of accepted and/or rejected annotations on an annotator basis may also be used as a relevancy factor (at 720), to determine whether the annotator is considered a subject matter expert in a certain area. Similarly, annotation length (at 722) and/or sentiment (at 724) can be used as a relevancy factor. For example, relevancy may depend on whether the annotation relates to a major change or to simple spelling edits and other typographical errors. Also, relevancy may be determined by evaluating how actionable and complete an annotation is. In some embodiments, annotation content is also used to determine relevancy (at 726). For example, whether an annotation includes links to other documents, web pages, media, people, aliases, or the like may be used to determine relevancy.

The amount of activity per content piece (or section) may also be used to determine relevancy (at 728). For example, a number of comments, edits, and other user actions may indicate whether a content piece is controversial, important, or critical to change. Also, a relationship of an annotation to a viewer may be used as a relevancy factor (at 730). For example, relevancy may be determined by determining whether an annotation is related to the viewer's role or responsibility or whether the annotation directly mentions the viewer.

As illustrated in FIG. 7A, all or a subset of these factors may be used to determine relevancy. In particular, as illustrated in FIG. 7B, a categorization and grouping engine (executed by, for example, the collaboration server 106) may receive as input one or more of these relevancy factors (at 740). The categorization and grouping engine may group annotations based on their relationship to the viewer, the activity the viewer can take, and the urgency of the annotations to the user as described above with respect to the method 200. The categorization and grouping engine may also generate a relevancy score for each annotation (at 742), which may be used to position an annotation within a particular group or at a particular position within a listing of annotations (at 744). In some embodiments, how or whether the annotation is displayed on a device may depend on the device's ability to maintain fidelity of an annotation, as described herein (at 746).

As also illustrated in FIG. 7B, the relevancy score (or a criticality score that may be calculated separate from or based on the relevancy score) determined for an annotation may be compared with one or more critical or notification thresholds to determine whether to generate a notification of the annotation for the viewer (at 750). In response to the relevancy score satisfying a notification threshold, a notification (email, text message, IM message, or the like) is generated and sent to the viewer via a communication channel, including, in some embodiments, a channel separate from document collaboration application or session.

As noted above, the automatic annotation filtering described above may be performed via a locally-installed application or a web- or cloud-based application and the document associated with the displayed annotations may be stored locally or remotely. Also, the collaborative computing environment described herein includes environments where users can access and edit content simultaneously, access and edit content in a non-simultaneous fashion, as well as environments where a document is shared among multiple users. For example, in some situations, the collaborative computing environment includes a first user creating a document via a locally-installed productivity application and emailing or otherwise transmitting the document to a second user who edits the document via a locally-installed productivity application. If the second user transmits the edited document back to the first user, the locally-installed productivity application of the first user may be configured to filter annotations based on relevancy as described above (even without the use of a collaboration server). Accordingly, the collaborative computing environment includes any sharing and editing of content between a plurality of users regardless of whether the sharing and editing is performed via a collaboration server or other web- or cloud-based environments or performed locally on a particular user device. In locally performed embodiments, annotations for edited content may be stored as part of the document shared among users (e.g., as part of document metadata). The locally performed embodiments may, however, access one or more servers to assign relevancy scores as described above.

Various features and advantages of some embodiments are set forth in the following claims.

What is claimed is:

1. A computer system for presenting content updates in a collaborative computing environment, the computer system comprising:
   a memory storing content and annotations generated in the collaborative computing environment; and
   an electronic processor communicatively coupled to the memory and configured to retrieve, from the memory, a plurality of annotations associated with a document;
      assign a relevancy score to each of the plurality of annotations based on at least one relevancy factor associated with the annotation;
      determine a subset of the plurality of annotations from the plurality of annotations based on the relevancy score for each annotation;
      display the subset of the plurality of annotations
      for each of the plurality of annotations, determine a criticality score for each of a plurality of collaborators associated with the document; and
      send a notification to one of the plurality of collaborators when the criticality score for the collaborator exceeds a notification threshold.

2. The system of claim 1, wherein the at least one relevancy factor associated with the annotation includes at least one selected from the group consisting of a characteristic of the annotation, a characteristic of an annotator of the document, a characteristic of a viewer of the document, and a relationship between the viewer and the annotator.

3. The system of claim 1, wherein the electronic processor is further configured to:
assign a weight to each of the plurality of annotations;
determine, for each of the plurality of annotations, a weighted relevancy score based on the relevancy score and the weight; and
determine a subset of the plurality of annotations by selecting a subset of the plurality of annotations based on the weighted relevancy score for each of the plurality of annotations.

4. The system of claim 1, wherein the electronic processor is further configured to
receive, from a user, a request to view the document;
retrieve the plurality of annotations and the document from the memory in response to receiving the request; and
display the subset of the plurality of annotations by displaying the subset of the plurality of annotations within a collaborative application associated with the document.

5. The system of claim 1, wherein the electronic processor is further configured to
sort the subset of the plurality of annotations into one or more groups based on a type for each annotation; and
display the subset of the plurality of annotations by displaying the subset of the plurality of annotations in a collapsed format based on the one or more groups.

6. The system of claim 1, wherein the document is one selected from the group consisting of a productivity application document, an email, an audio file, a video file, an image file, and a web page.

7. The system of claim 1, wherein the electronic processor is further configured to display the subset of the plurality of annotations by displaying the subset of the plurality of annotations in descending order based on the relevancy score for each of the subset of the plurality of annotations.

8. The system of claim 1, wherein the electronic processor is further configured to determine the subset of the plurality of annotations by selecting annotations with a relevancy score that exceeds a threshold.

9. The system of claim 1, wherein the at least one relevancy factor associated with the annotation includes at least one selected from the group consisting of a relationship of the annotation to an upcoming event or action associated with a viewer of the document, a relationship between an electronic communication associated with the viewer and the annotation, an ability of the viewer to read, review, and respond to the annotation, a quality of the annotator, a quantity of accepted annotations for the annotator, a quantity of rejected annotations for the annotator, and an amount of activity for a portion of the document.

10. A method for presenting content updates in a collaborative computing environment, the method comprising:
receiving, from a user, a request to view a document;
retrieving, from a memory storing content and annotations generated in the collaborative computing environment, the document and a plurality of annotations associated with the document;
assigning, with an electronic processor, a relevancy score to each of the plurality of annotations based on at least one relevancy factor associated with the annotation;
determining, with the electronic processor, a subset of the plurality of annotations from the plurality of annotations based on the relevancy score for each annotation;
displaying, via a human machine interface, the subset of the plurality of annotations within a collaborative application associated with the document
for each of the subset of the plurality of annotations, determining a criticality score for each of a plurality of collaborators associated with the document;
wherein displaying the subset of the plurality of annotations includes sending a notification to one of the plurality of collaborators when the criticality score for the collaborator exceeds a notification threshold.

11. The method of claim 10, wherein assigning a relevancy score to each of the plurality of annotations includes assigning a relevancy score based on at least one selected from the group consisting of a characteristic of the annotation, a characteristic of an annotator of the document, a characteristic of the user, and a relationship between the user and the annotator.

12. The method of claim 10, further comprising:
assigning a weight to each of the plurality of annotations; and
determining, for each of the plurality of annotations, a weighted relevancy score based on the relevancy score and the weight;
wherein determining a subset of the plurality of annotations includes selecting a subset of the plurality of annotations based on the weighted relevancy score for each of the plurality of annotations.

13. The method of claim 10, further comprising:
sorting the subset of the plurality of annotations into one or more groups based on a type for each annotation;
wherein displaying the subset of the plurality of annotations includes displaying the subset of the plurality of annotations in a collapsed format based on the one or more groups.

14. The method of claim 10, wherein retrieving the document includes retrieving one selected from the group consisting of a productivity application document, an email, an audio file, a video file, an image file, and a web page.

15. The method of claim 10, wherein displaying the subset of the plurality of annotations includes displaying the subset of the plurality of annotations in descending order based on the relevancy score for each of the subset of the plurality of annotations.

16. The method of claim 10, wherein determining the subset of the plurality of annotations includes selecting annotations with a relevancy score that exceeds a threshold.

17. The method of claim 10, wherein retrieving a plurality of annotations includes retrieving at least one selected from the group consisting of an addition, a deletion, an alteration, and a comment.

18. A non-transitory computer-readable medium including instructions executable by an electronic processor to perform a set of functions, the set of functions comprising:
receiving, from a user, a request to view a document;
retrieving, from a memory storing content and annotations generated in the collaborative computing environment, the document and a plurality of annotations associated with the document;
assigning a relevancy score to each of the plurality of annotations based on at least one relevancy factor associated with the annotation;
determining a subset of the plurality of annotations from the plurality of annotations based on the relevancy score for each annotation;
displaying the subset of the plurality of annotations within a collaborative application associated with the document for each of the subset of the plurality of annotations, determining a criticality score for each of a plurality of collaborators associated with the document;
wherein displaying the subset of the plurality of annotations includes sending a notification to one of the plurality of collaborators when the criticality score for the collaborator exceeds a notification threshold.

* * * * *